United States Patent
Kennedy

[11] 3,916,378
[45] Oct. 28, 1975

[54] VEHICLE SAFETY SIGNAL DEVICE
[76] Inventor: John S. Kennedy, 38059 Alcoy, Sterling Heights, Mich. 48077
[22] Filed: May 10, 1974
[21] Appl. No.: 468,814

[52] U.S. Cl. .................................. 340/87; 340/107
[51] Int. Cl.² .......................................... B60Q 1/00
[58] Field of Search .......... 340/70, 73, 91, 95, 107, 340/84, 90, 87

[56] References Cited
UNITED STATES PATENTS

| | | | |
|---|---|---|---|
| 2,657,379 | 10/1953 | Zappia | 340/90 |
| 2,812,423 | 11/1957 | Penna | 340/90 X |
| 3,274,548 | 9/1966 | Brimsek | 340/107 X |
| 3,800,430 | 4/1974 | Samra | 340/95 |

Primary Examiner—Donald J. Yusko
Attorney, Agent, or Firm—Basile and Weintraub

[57] ABSTRACT

A vehicle safety signal device for use in conjunction with an automobile. In one embodiment the device is adapted to be removably mounted to the top of an automobile and includes illuminating means electrically connected by a wire to the automobile cigar lighter socket to energize the electrical illuminating means. The device is retained to the top of the automobile by means of the electric wire extending through one side window of the automobile while a second tie down cord extends from the device through the opposite side window of the automobile. The tie down wire and the electric cord are both provided with a locking member which restrains withdrawal of the wires from the car while the car windows are in a raised position.

In a second embodiment of the present invention, a signaling unit is provided with a translucent message plate having the words "Backing up" imprinted thereon. The device is mounted on the rear deck of the passenger compartment with the message plate facing the interior of the rear window such that upon actuation of an illuminating means carried by the unit behind the message plate, the words "Backing up" are visable from behind the automobile.

3 Claims, 6 Drawing Figures

VEHICLE SAFETY SIGNAL DEVICE

BACKGROUND OF THE INVENTION

1. Field of the Invention

The present invention relates to the art of visual signaling systems for vehicles and, more particularly, the present invention relates to safety signal devices for providing a source of illumination from an automobile for use in the event of a disability of the automobile so as to warn oncoming traffic or for the purpose of projecting a flashing word message to the rear of the automobile to warn oncoming traffic.

2. Description of the Prior Art

Conventional automobile vehicle lights such as stop lights, flasher emergency lights and turn signal lights are usable for ordinary circumstances when an automobile is in proper working order. However, with the advent of high speed driving, it is necessary that a disabled vehicle be sufficiently lighted so as to provide warning to oncoming traffic that a vehicle is disabled. For example, an automobile traveling at 70 miles per hour requires several hundred feet in order to safely stop, and as such it is imparative that the drivers of vehicles be given sufficient warning of a disabled car.

The aforementioned conventional lighting systems of present day automobiles do not provide such advance warning. In addition such signals do not give an advanced indication or warning of the intent of the driver to back up the vehicle such as when the vehicle is to be parked. The prior art devices have not provided an efficient indicator that will signal, in advance, to oncoming traffic that a vehicle is about to back up, so as to provide an opportunity for following vehicles to manuver out of position so that traffic will not be blocked and to prevent the possibility of a collision.

Examples of prior art devices are illustrated in U.S. Pat. Nos. 1,629,425, 2,812,423, 3,037,188, 3,153,294, 3,274,548, 3,471,829 and 3,656,104.

SUMMARY OF THE INVENTION

The present invention which will be described subsequently in greater detail comprises a vehicle safety signal device, which in one form is adapted for use on top of an automobile, and includes means for releasably attaching the device to the automobile without the need for mechanical fasteners or magnetic devices. In a second embodiment of the present invention a vehicle safety signaling unit is provided for mounting on the rear deck of the automobile passenger compartment so as to provide a visual indication of the intention of the driver to move the vehicle rearwardly.

It is therefore an object in the present invention to provide a new and improved signaling device which may be easily manipulated and simply secured to the roof of an automobile.

It is another of the present invention to provide a signaling unit which may be simply secured to the rear deck of an automobile for the purposes of providing a rearwardly directed visual message.

It is still another object of the present invention to provide a signaling device for use in conjunctions with vehicles that is simple in construction and design, and thus inexpensive to manufacture and maintain.

Other objects, advantages and applications of the present invention will become apparent to those skilled in the art of vehicle safety signal devices when the accompanying description of the best modes contemplated for practicing the invention is read.

BRIEF DESCRIPTION OF THE DRAWING

The description herein makes reference to the accompanying drawing wherein like reference numerals refer to like components throughout the several views, and in which.

DESCRIPTION OF THE PREFERRED EMBODIMENTS

Figure 1:
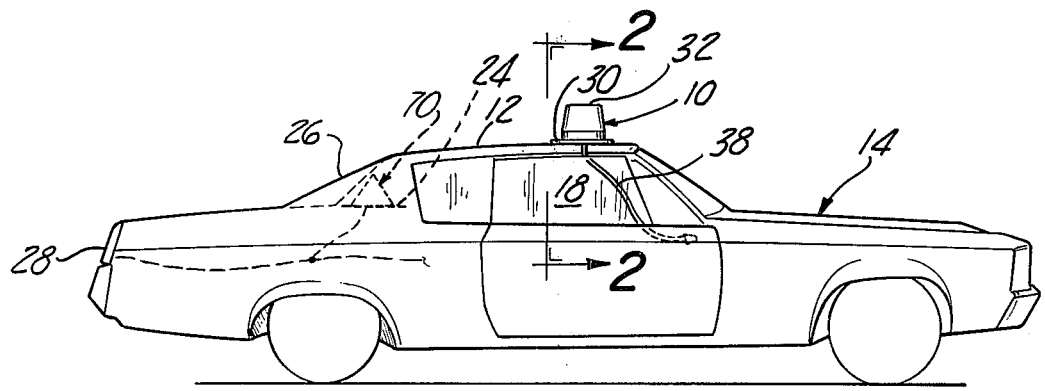
FIG. 1 is a side elevational view of an automobile incorporating a vehicle safety signal device constructed in accordance with the principles of the present invention.
Figure 5:
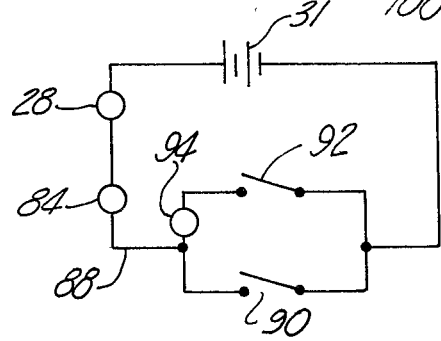
FIG. 5 is a schematic electrical diagram illustrating one example of the electrical connection utilized in conjuction with the vehicle safety signaling unit illustrated in FIG. 4; and, FIG. 6 is a fragmentary cross sectional view through yet another example of a vehicle safety signaling unit mounted to the rear deck of an automobile passenger compartment.

Referring now to the drawings and, in particular, to FIG. 1 wherein there is illustrated one example of the present invention in the form of a vehicle safety signal device 10, which is mounted to the roof 12 of a conventional automobile 14. As can best be seen in FIGS. 1 and 2 the automobile 14 is conventional in its construction in that it is provided with a side window 16 on the drivers side of the automobile and a side window 18 on the passengers side of the automobile. The interior of the automobile 14 is also conventional and includes a electrical cigar lighter socket 20 mounted on the dashboard 22. The automobile 14 has a rear deck 24 (FIG. 1) adjacent a rear window 26. The automobile 14 is also provided with conventional back-up lights 28 that are electrically connected to the automobile battery 31 (FIG. 5).

Since the aforementioned automobile components are conventional on most American and Foreign made automobiles, a further detailed description of these components is not necessary.

Figure 2:
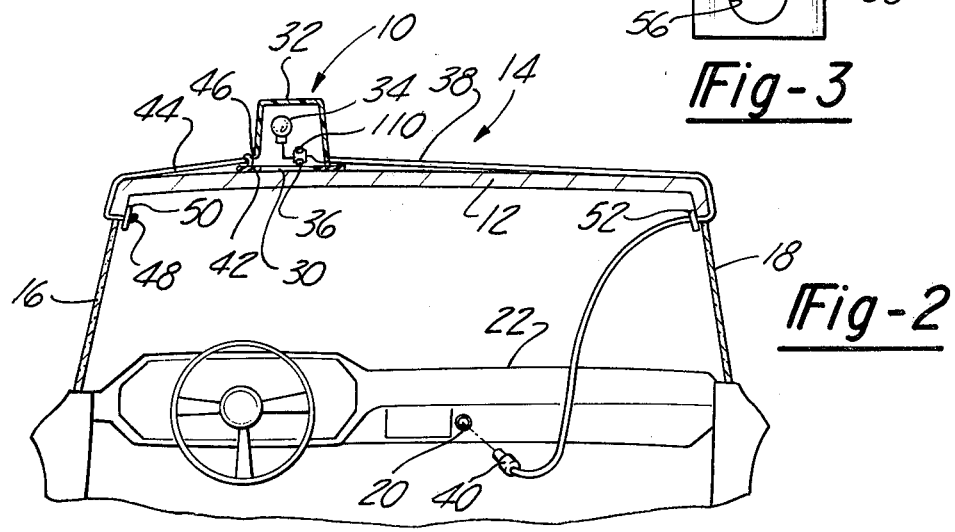
FIG. 2 is a cross sectional view through the automobile showing the mounting of one example of a vehicle safety signal device and taken along line 2—2 of FIG. 1.

As can best be seen in FIG. 2, the vehicle safety signal device 10 comprises a circular base 30 and a cup-shaped translucent cover 32 which is attached to the upper peripherial edge of the base 30 by any suitable means, such as in a snap lock fashion, or the like. The base 30 includes a conventional socket support for mounting a lightbulb 34, which is electrically connected through a conventional flasher unit 36 to an electrical wire 38. It should be noted that the electrical wire 38 extends through a suitable aperture in the base 30 with the wire 38 being knotted on the inside of the aperture to prevent the withdrawal of the wire 38 from the base 30 when a tension force is exerted on the wire 38.

Still referring to FIG. 2, the electrical wire 38 terminates in an electrical plug 40, which is conventional in its construction and commercially available, in that the same includes a body portion sized to be inserted within the cigar lighter socket 20 for a locking contact with the electrical contacts within the socket 20 to provide an electrical connection between the lightbulb 34 and the battery 31. At the same time, the lightbulb 34 is grounded by any suitable means. The flat bottom of the signal device base 30 is provided with a ring shaped rubber support 42 which permits the positioning of the signal device 10 on top of the roof 12 without concern for scratching the same. The base 30 is also provided with a second aperture that is diametrically opposite from the electric wire aperture and is adapted to receive one end of a tie down cord 44. The end of the tie down cord 44 is knotted at 46 to prevent the passage of the cord 44 therethrough. The other end of the tie down cord 44 is also knotted, as shown at 48, for the purpose of retaining a locking member 50 onto the tie down cord 44. As can best be seen in FIG. 2, when the side window 16 is in a raised position, the upper edge of the window 16 will abut the tie down cord 44, while the locking member 50 is on the interior of the car 14. It can be seen that if a tension force is exerted on the tie down cord 44, withdrawal of the tie down cord 44 from within the car is prevented by the abutment of the locking member 50 against the window 16.

Figure 3:
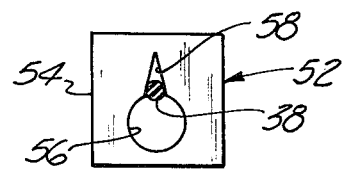
FIG. 3 is a fragmentary view of an element utilized in securing the vehicle safety signal device illustrated in FIGS. 1 and 2.

The electric wire 38 is provided with a second locking member 52 which is slidably movable along the length of the electric wire 38. As can best be seen in FIG. 3, the sliding lock member 52 comprises a rectangularly shaped body section 54 having a circular aperture 56 through which the electric wire 38 may easily slide, that is, the clearance space between the outer diameter of the electric wire 38 and the diameter of the aperture 56 is relatively large. A portion of the aperture 56 communicates what the wide end portion of a tapered slot 58 for the purpose of permitting the wire 38 to be forced into the tapered slot 58 so as to prevent relative movement between the electric wire 38 and the locking member 52. As can best be seen in the FIG. 2, when the vehicle safety signal device 10 is positioned on the roof 12 of the automobile 14, and the tie down cord 44 is secured in place by the side window 16 in the aforementioned matter, the electric wire 38 is inserted through the side window 18 of the automobile 14. A sufficient tension force is exerted on the electric wire 38 so as to securily mount the device 10 to the roof 12 of the car. The side window 18 is then raised while the locking member 52 is moved along the electric wire 38 until it is in abutment with the inner surface of the side window 18, where upon the wire 38 is forced into the tapered slot 58, and the tension exerted on the wire 38 secures the device 10.

It can be seen that by inserting the electric plug 40 into the cigar socket 20, the signal light will function to provide illumination and by means of the flasher unit 36 the illumination will be of a flashing nature.

Thus it be seen that the present invention provides a vehicle safety signal device which can be simply and easily mounted to the top of a vehicle without the need for any mechanical fastening devices which are attachable to the roof and without the need for magnets which might mar the inner surface of the roof. It can also be seen that the signal device 10 is provided with a simple attaching device which is adaptable fit any size automobile as the sliding locking member 52 provides an adjustable mounting feature not known in the prior art.

Figure 4:
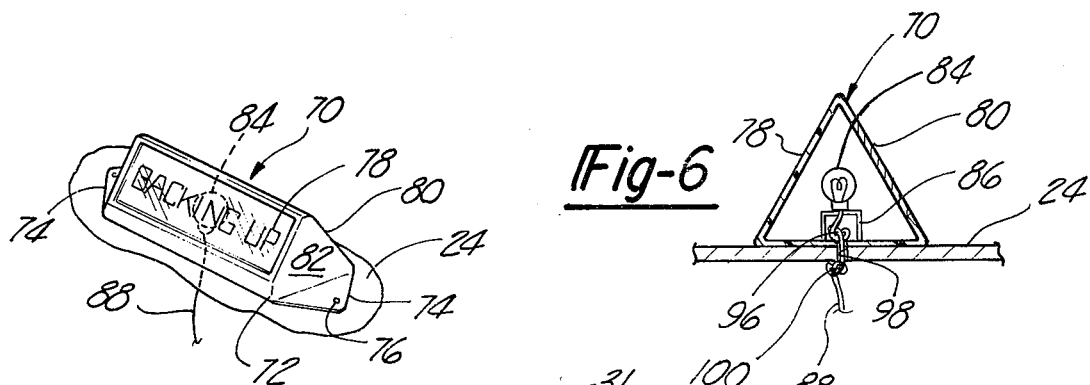
FIG. 4 is a fragmentary prospective view of a second embodiment of the present invention in the form of a vehicle safety signaling unit mounted on the deck of an automobile passenger compartment adjacent to the rear window.
Figure 6:
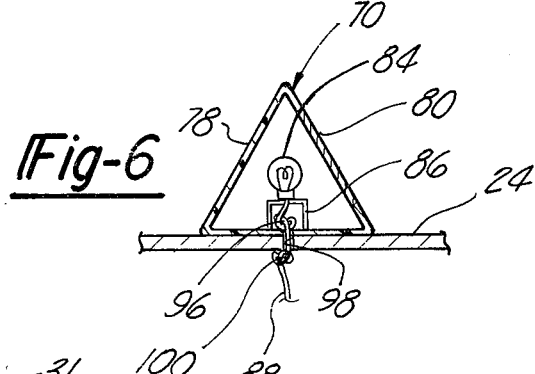

Referring now to FIGS. 4, 5, and 6, for a description of a second embodiment of the present invention in the form of a back-up signaling unit 70, which is adapted to be mounted within the passenger compartment of the automobile 14 on the deck 24 in front of the rear window 26. The unit 70 is preferably fabricated from metal or plastic, and comprises a base portion 72, which is rectangular in shape having side brackets 74 that are utilized to mount the unit 70 to the deck 24 by any suitable means such as screws 76.

The base 72 has an inclined rear wall 78 that is fabricated from a translucent material to define a translucent message plate and a front wall 80 which may be solid. The edges of the front and rear walls of the unit 70 are enclosed by triangularly shaped side wall 82, which preferably are attached to the front wall 80 in such a manner as to permit the wall 80 to be pivoted away from the base 72 and permit access to the interior of the unit 70, wherein an electric bulb 84 is mounted in a conventional socket 86 which, in turn, is electrically connected to the back-up light circuitry of the automobile by means of an electric wire 88.

As can best be seen in FIG. 5, a schematic diagram of the back-up light circuitry is shown as comprising the battery 31 and a transmission lever switch 90 that connects the back-up lights 28 to the battery 31 such that the back-up lights 28 are actuated upon positioning of the transmission lever into a reverse position. The switch 90 is also connected to the wire 88 such that the electric bulb 84, within the signaling unit 70 is illuminated at the same time the back-up lights 28 are illuminated.

As can best be seen in FIG. 4, the translucent message plate has the words "Backing up" thereon such that upon illumination of the lightbulb 84, persons behind the automobile 14 may be warned that the vehicle is about to be driven rearwardly.

As can be seen in FIG. 5, a second manually operated switch 92, which may be located on the dash 22, connects the battery 31 directly with the lightbulb 84 and a flasher unit 94, such that both the back-up lights 28 and the unit 70 may be caused to flash on and off when it is desired to utilize the same in an emergency situation, such as when the vehicle is disabled. This would permit the unit 70 to be used in conjunction with the vehicle safety signal 10 which has been described hereinbefore.

Referring now to FIG. 6, wherein there is illustrated a second and preferred method for mounting the signal unit 70 to the deck 24 of the automobile 14. In this embodiment the base 72 is provided with an aperture through which the electric wire 88 extends, with the wire 88 being knotted at 96 above the aperture so that the wire 88 can not be withdrawn through the aperture when a tension force is exerted on the same. The wire 88 extends through a second aperture 98 in the deck 24, with the wire 88 being knotted as shown at 100 on the bottom side of the deck 24, whereupon the unit 70 is securely attached to the deck 24 without the need for the bracket 74 or the fastening screws 76.

It can thus be seen that the present invention has provided new and improved vehicle safety signal devices and units which are simply and inexpensively fabricated and mounted to an automobile in a most convenient manner.

Although several forms of the present invention have been disclosed, it should be apparent that those skilled in the art of vehicle safety signal devices, that other forms may be had, or coming within the spirit of the invention and scope of the appended claims.

It should be noted that the vehicle safety signal 10 may be used as a flashlight by providing a switch 110 which will electrically bypass the flasher unit 36 and thus, the signal 10 will light continuously.

It should also be noted that although the back-up signaling unit 70 is illustrated as having a triangular cross-section, the unit 70 may be of any shape or cross-section, as desired. In the preferred embodiment, the interior surfaces of the walls of the unit 70 are coated with a reflective material to provide an efficient unit.

What is claimed is as follows:

1. A vehicle safety signal device for use in conjunction with a vehicle having a roof, said vehicle safety signal device comprising a base portion removably attached to said vehicle roof; said base portion having releasably attachable thereto a translucent cover; an electric light; means supporting said electric light on said base within said transparent cover such that upon actuation said light is visable from outside said transparent cover; an electric cord having one end electrically connected to said electric light; a tie down cord having one end attached to said signal device base, and the other end of said tie down cord being insertable through a side window of said automobile and having an enlarged end section which cooperates with a window of said automobile when the same is in a raised position to restrain withdrawal of said tie cord from said automobile window; said electric wire being insertable through an opposing side window of said vehicle having a lock member slidably movable along said electric wire for engaging the upper edge of said opposing side window for restraining outward movement of said wire from said automobile, whereby said vehicle safety signal device is secured to said roof by the tension of said tie down cord and electric wire.

2. The vehicle safety signal device defined in claim 1 further comprising light flashing means in said signal device base and electrically connected to said electric light.

3. The vehicle safety signal device defined in claim 1 wherein said sliding lock member comprises a body portion having an aperture through which said wire extends, said aperture being so sized with respect to said electric wire that said body section is freely movable over said wire; said body portion having a tapered slot extending from said aperture for forceably receiving said electric wire to secure said sliding member body portion to said wire when the same is forceably positioned within said tapered slot.

* * * * *